(12) United States Patent
Adachi et al.

(10) Patent No.: US 6,304,633 B1
(45) Date of Patent: Oct. 16, 2001

(54) TESTING SYSTEM FOR VOICE SYSTEM EQUIPMENT IN SWITCHBOARD

(75) Inventors: Hiroshi Adachi, Fukuoka; Shinji Yamada, Nagoya; Shinji Segawa, Nagoya; Morimitsu Miura, Nagoya, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/411,071

(22) Filed: Oct. 4, 1999

(30) Foreign Application Priority Data

Oct. 5, 1998 (JP) .................................................. 10-282195

(51) Int. Cl.$^7$ ...................................................... H04M 1/24
(52) U.S. Cl. ................................ 379/12; 379/1.01; 379/9; 379/15.01; 379/16; 379/29.01; 379/32.02
(58) Field of Search ............................... 379/1, 9, 10, 14, 379/15, 26, 27, 29, 32, 34, 12

(56) References Cited

U.S. PATENT DOCUMENTS

| | | | |
|---|---|---|---|
| 5,461,662 | * 10/1995 | Hanai | 379/9 |
| 5,572,570 | * 11/1996 | Kuenzig | 379/1 |
| 5,633,909 | * 5/1997 | Fitch | 379/15 |
| 5,933,475 | * 8/1999 | Coleman | 379/1 |
| 5,940,472 | * 8/1999 | Newman et al. | 379/1 |
| 5,946,372 | * 8/1999 | Jones et al. | 379/1 |

FOREIGN PATENT DOCUMENTS 2-124670  5/1990 (JP) .
6-62008   3/1994 (JP) .

* cited by examiner

Primary Examiner—Binh Tieu
(74) Attorney, Agent, or Firm—Helfgott & Karas, P.C.

(57) ABSTRACT

A testing system for voice system equipment in a switchboard includes a testing maintenance terminal for inputting telephone number information of an ordinary subscriber's telephone that is to be designated as a maintenance party telephone. The testing maintenance terminal can be a testing maintenance terminal of a general-purpose information processing unit. A call processing block inside a control unit of the switchboard includes a test accepting module for accepting the telephone number information from the testing maintenance terminal and for transmitting a call message to a call control module, in addition to the call control module and a translation module. Therefore, when the telephones number information of the ordinary subscriber's telephone designated as the maintenance party telephone is inputted from the testing maintenance terminal, the call control module and the translation module execute an emulation processing for the call connection processing to the ordinary subscriber's telephone designated as the maintenance party telephone in accordance with the call message transmitted from the test accepting module, in the same way as the ordinary call connection processing. Consequently, various tests can be conducted by using the ordinary subscriber's telephone as the maintenance party telephone for the test of the voice system equipment of the switchboard.

11 Claims, 13 Drawing Sheets

TESTING SYSTEM FOR VOICE SYSTEM EQUIPMENT IN SWITCHBOARD

BACKGROUND OF THE INVENTION

1. Field of the Invention

This invention relates to a testing system for voice system equipment in a switchboard. Recently, introduction of a centralized maintenance system for a switchboard has made steady progress in the field of communication networks, and a maintenance interface between different kinds of switchboards has been integrated, as typified by TMN (Telecommunication Management Network). In the testing of voice system equipment in the switchboard, too, a testing system that does not depend on the kind of the switchboard has been required. The present invention is concerned with such a testing system.

2. Description of the Related Art

FIG. 13 of the accompanying drawings shows the basic construction of a testing system for voice system equipment in a switchboard according to the prior art. To test voice system equipment in the switchboard, a different kind of tester is used for each test object, and the test is conducted in accordance with the test procedure that is different for each test object. A subscriber test will be explained hereby as a typical example of the tests for voice system equipment with reference to FIG. 13.

In the drawing, reference numeral 13-1 represents a centralized maintenance office (CMOC). Various tests and maintenance of subordinate switchboards can be made concentratedly from the centralized maintenance office (CMOC). Reference numeral 13-2 represents a local station (LS). The local station (LS) is the terminal station of the switching stage, and stores the subscriber's telephones.

Reference numeral 13-3 represents a testing maintenance terminal (TWS) for conducting various tests, and an information processing unit such as a personal computer is mainly used. Reference numeral 13-4 represents a voice system test auxiliary device (CBOX) that assists the voice system test by the testing maintenance terminal (TWS). It communicates with the testing maintenance terminal (TWS), and has a simulated incoming/outgoing function and an interface function with a specific trunk (MALTI) for conducting various tests.

Reference numeral 13-5 represents the specific trunk (MALTI) having an adapter function for connecting the testing maintenance terminal (TWS) and the voice system test auxiliary device (CBOX) to a switching unit (NW) of the switchboard. It has a function of gathering a test control signal from the testing maintenance terminal (TWS) and a voice signal from the voice system test auxiliary device (CBOX) into one channel, and transmitting them, and a call function.

Reference numeral 13-6 represents a transit trunk (DT) between offices, reference numeral 13-7 represents a switching unit (NW) of the switchboard and reference numeral 13-8 represents a control unit (CC) of the switchboard. Reference numeral 13-9 represents a subscriber test transit device (LTAP). It is interposed between the specific trunk (MALTI) and a subscriber tester (LTE) and relays the test signal.

Reference numeral 13-10 represents the subscriber local tester (LTE). The subscriber testers are disposed in a plurality of stages in accordance with the scale of subscribers that are stored. Reference numeral 13-11 represents a subscriber interface card (SLC), and reference numeral 13-12 represents a subscriber's telephone (TEL).

Reference numeral 13-13 represents a testing maintenance terminal (TWS) provided to the local station (LS), reference numeral 13-14 represents the voice system test auxiliary system (CBOX) provided to the local station (LS) and reference numeral 13-15 represents the specific trunk (MALTI) provided to the local station (LS).

The maintenance party conducts a subscriber test such as a line test and a speech test of the subscriber's telephone 13-12 by using the local tester (LTE) 13-10 installed in the local station (LS) 13-2. The subscriber test procedures of the centralized maintenance office (CMOS) by the maintenance party are as follows.

(1) The maintenance party of the centralized maintenance office (CMOS) retrieves the local station (LS) storing the subscriber's telephone to be tested, and inputs the station ID (station identification data) of this station from the testing maintenance terminal (TWS) 13-3.

(2) The testing maintenance terminal (TWS) 13-3 generates a call to the subscriber test transit device (LTAP) 13-9 of the local station (LS) storing the tested subscriber's telephone (TEL) on the basis of this station ID through the specific trunk (MALTI) 13-5.

(3) The control unit 13-8 of the switchboard executes the ordinary call processing for the call described above, and sets a voice path between the subscriber test transit device (LTAP) of the local station (LS) 13-9 and the specific trunk (MALTI) 13-5 of the centralized maintenance office (CMOC).

Incidentally, the specific trunk (MALTI) 13-5 allocates 56 Kbps of 64 Kbps of the voice path to the voice signal of the voice system test auxiliary device (CBOX) 13-4 and the remaining 8 Kbps to the test. signal of the testing maintenance terminal (TWS) 13-3, and transmits them.

(4) When the voice path is thus set and this; setting is reported to the maintenance party, the maintenance party inputs the telephone number of the tested subscriber's telephone (TEL) to the testing maintenance terminal (TWS) 13-3. This telephone number is sent to the subscriber test transit device (LTAP) 13-9 through the specific trunk (MALTI) 13-5, and is reported to the control unit (CC) 13-8 of the switchboard of the local station (LS) from the subscriber test transit device (LTAP) 13-9.

(5) The control unit (CC) of the switchboard of the local station (LS) retrieves the subscriber interface card (SLC) 13-11 and the subscriber test device (LTE) 13-10 corresponding to the telephone number, and sets the voice path between the subscriber test device (LTE) 13-10 and the subscriber test transit device (LTAP) 13-9.

(6) When the subscriber interface card (SLC) is retrieved and the test preparation is completed, the result is reported to the maintenance party and then the maintenance party starts the subscriber test.

(7) When other subscribers' telephones of the same local station (LS) are tested, the same procedures are repeated from the procedure (4) described above.

The above explains the subscriber test procedure. Incidentally, when the subscriber test is conducted by using the testing maintenance terminal (TWS) 13-13, the voice system test auxiliary device (CBOX) 13-14 and the specific trunk (MALTI) 13-15 inside the local. station (LS), too, the same procedure is employed after the specific trunk (MALTI) 13-15 is connected to the subscriber test transit device (LTAP) 13-9.

The testing system for voice system equipment in the switchboard described has been employed with the following background. In the first place, the first required specification of the testing system for voice system equipment in the switchboard is that the testing system can execute communication between a tester such as a subscriber tester and the testing maintenance terminal. Here, the tester is an exclusive testing instrument assembled into the switchboard, and the testing maintenance terminal is basically a general-purpose information processing unit such as a personal computer.

The tester such as the subscriber tester is disposed in a plurality of stages for a predetermined number of subscriber interface cards in accordance with the scale of subscribers that are stored. Therefore, in order to satisfy the first required specification described above, a communication route must be established between the testing maintenance terminal and the tester corresponding to the subscriber as the test object among a plurality of testers. Since the tester and the testing maintenance terminal do not correspond on a 1:1 basis, switching for connecting them becomes necessary.

To satisfy such a requirement, a possible measure may be a construction in which the test information is sent from the testing maintenance terminal to a software processing section of the control unit of the switchboard, and the control unit of the switchboard relays this test information and sends it to the corresponding tester.

According to such a construction, however, the position of installation of the testing maintenance terminal is limited to the range within which the test information can be transmitted by physically connecting the testing maintenance terminal to the control unit of the switchboard. In other words, the testing maintenance terminal must be installed in an area having a predetermined distance from the control unit of the control unit of the switchboard.

Therefore, a construction has been employed in which the tester and the testing maintenance terminal are connected by the voice path of the switching unit in the switchboard so as to establish the communication route of the test information. Connection between the testing maintenance terminal and the switchboard may be made through a MODEM, but the following second required specification must be taken into consideration, too.

The second required specification for the testing system for voice system equipment in the switchboard is that the tester such as the subscriber tester and the telephone of the testing maintenance terminal must be connected by the voice path in order to test voice system equipment in the switchboard.

To satisfy this requirement, it is necessary that the voice path be established from the telephone of the testing maintenance terminal to the tester corresponding to the subscriber's telephone of the test object among a plurality of testers. Since the tester and the testing maintenance terminal do not correspond on, a 1:1 basis, switching becomes necessary for connecting the voice path.

Therefore, it may be possible to generate a call in the same way as the ordinary call from the telephone of the testing maintenance terminal to the corresponding tester and thus to establish the voice path. According to this construction, however, it is necessary to request the control unit of the switchboard to report the telephone number of the corresponding tester for each test and to conduct the call operation for each test. Therefore, the operation becomes troublesome.

The testing system of voice system equipment of the switchboard according to the prior art solves the problem described above by preparing the voice system test auxiliary device (CBOX) 13-4, the specific trunk (MALTI) 13-5 as the adapter for the exclusive use for the maintenance party terminal and the subscriber test transit device (LTAP) 13-9 for exclusive use for testing and maintenance, as explained with reference to FIG. 13.

Nonetheless, the testing system for voice system equipment in the switchboard according to the prior art is not yet free from the following problems (1) to (4), and future testing systems will be required to solve these problems.

(1) The voice system test auxiliary device and the adapters for exclusive use for testing and maintenance are necessary, and they result in the increase of the cost in switchboards having a limited scale.

(2) Since the special devices for testing and maintenance are mounted to the switchboard, it is extremely difficult to transfer and adapt the same testing devices to other kinds of switchboards.

(3) When remote maintenance is to be done, a subscriber test transit device, and the like, equipped with the interface function with the centralized maintenance office is necessary, and remote maintenance cannot be done from equipment other than from the centralized maintenance office.

(4) When the maintenance operation is made from the centralized maintenance office, the local station of the subscriber as the test object must be first designated, and the maintenance party must recognize the correspondence between the telephone number of the subscribers telephone as the test object and the station ID of the local station storing the subscriber. Therefore, the operation becomes troublesome.

SUMMARY OF THE INVENTION

It is an object of the present invention to provide a testing system for voice system equipment in a switchboard, which testing system makes it possible to conduct various tests from an arbitrary station by using an ordinary subscriber's telephone and a general-purpose information processing unit such as a personal computer, without using specific means for exclusive use for testing voice system equipment of the switchboard.

According to one aspect of the present invention, (1) a testing system for voice system equipment in a switchboard includes, inside a call processing block of a control unit of the switchboard, a test accepting module, a call control module and a translation module, wherein the test accepting module has a function of transmitting a call message to the call control module on the basis of telephone number information of an ordinary subscriber's telephone designated as a maintenance party telephone from a testing maintenance terminal; wherein the call control module and the translation module each have a function of executing an emulation processing of a call connection processing for the ordinary subscriber's telephone designated as the maintenance party telephone in accordance with the call message transmitted from the test accepting module, in the same way as in the case of an ordinary call connection processing; and wherein the testing system has a construction such that the ordinary subscriber's telephone designated as the maintenance party telephone is connected to voice system equipment in the switchboard or the switchboard or to the testing system through a voice path set by the switchboard.

(2) The testing system has a construction such that the ordinary subscriber's telephone designated as the maintenance party telephone is connected to a tester for a subscriber circuit test and a subscriber line test through the voice path set by the switchboard.

(3) The testing system has a construction such that, the ordinary subscriber's telephone designated as the maintenance party telephone is connected to a trunk as a test object for executing a trunk junction test through the voice path set by the switchboard.

(4) The testing system has a construction such that the ordinary subscriber's telephone designated as the maintenance party telephone is connected to a sound source apparatus for generating various kinds of tones or a talky trunk for sending a voice announcement through the voice path set by the switchboard.

(5) The testing system has a construction such that the ordinary subscriber's telephone designated as the maintenance party telephone is connected to a subscriber's telephone, which is an object of monitoring, or to an outgoing trunk or to an incoming trunk, through the voice path set by the switchboard.

(6) The testing maintenance terminal is connected to a control unit of the switchboard as the test object through a local area network or a wide area network.

The ordinary subscriber's telephone designated as the maintenance party telephone may be a subscriber's telephone connected to the switchboard as the test object, or a subscriber's telephone connected to switchboards other than the switchboard as the test object.

DESCRIPTION OF THE PREFERRED EMBODIMENTS

Figure 1:
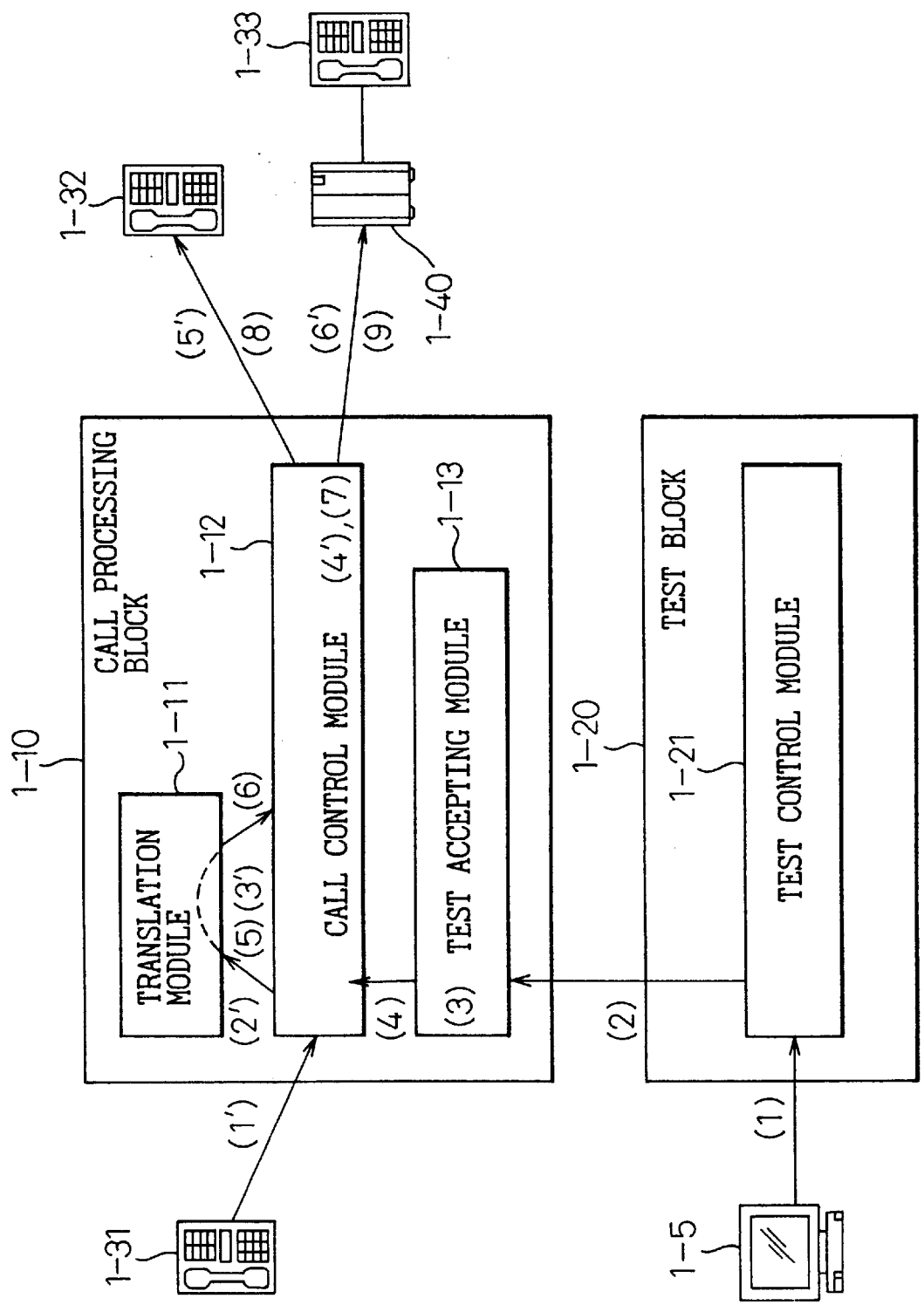
FIG. 1 is a block diagram of a testing system for voice system equipment in a switchboard according to one embodiment of the present invention.
Figure 2:
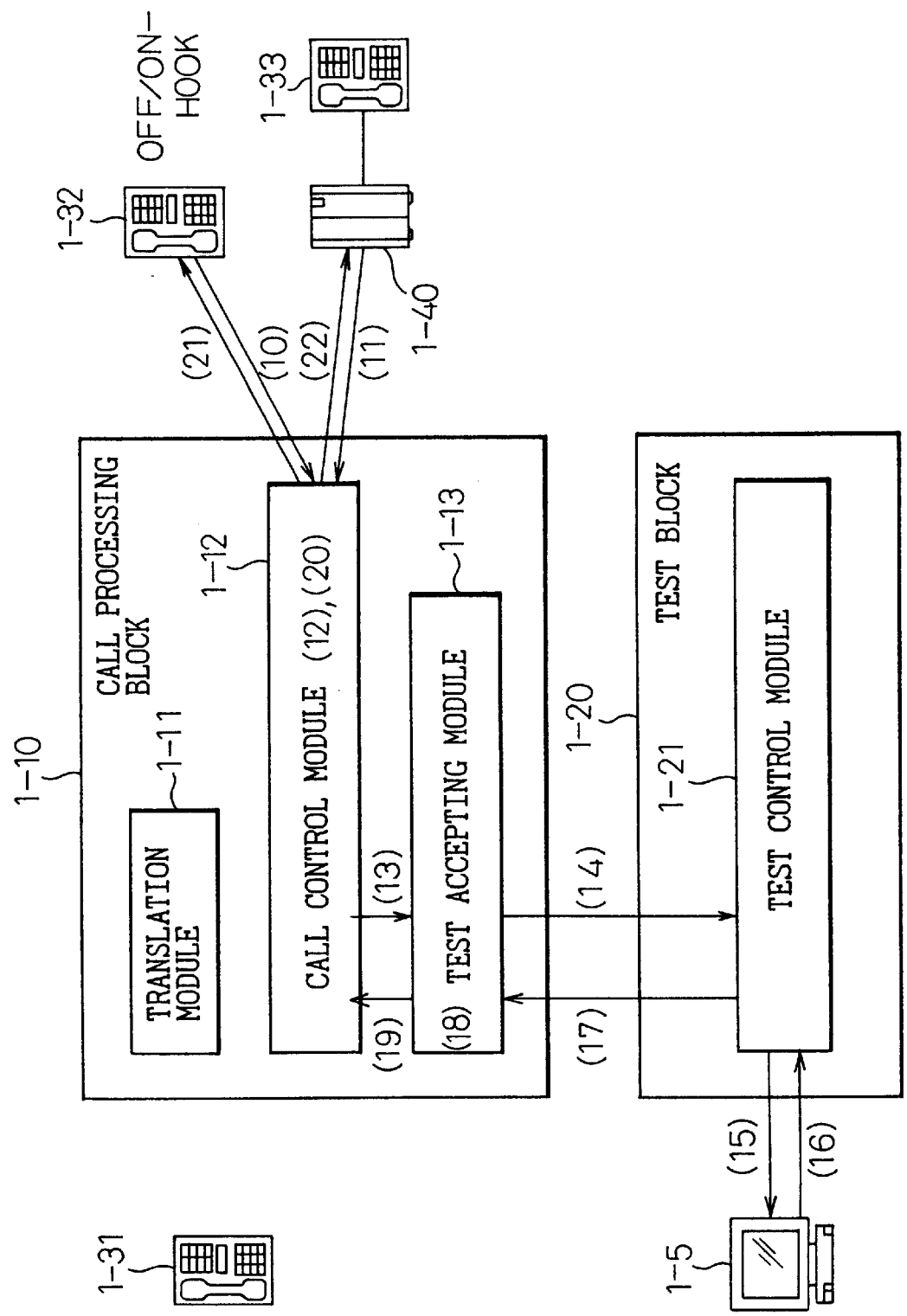
FIG. 2 is a block diagram useful for explaining the connection procedure in the system shown in FIG. 1.

FIGS. 1 and 2 are block diagrams of a testing system for voice system equipment in a switchboard according to one embodiment of the present invention. In the drawings, reference numeral 1-10 represents a call processing block of the switchboard. Reference numeral 1-11 represents a translation module. Reference numeral 1-12 represents a call control module. Reference numeral 1-13 represents a test accepting module. Reference numeral 1-20 represents a test block of the switchboard. Reference numeral 1-21 represents a test control module. Reference numerals 1-31 and 1-32 represent subscribers' telephones stored in an intra-office switchboard. Reference numeral 1-40 represents an extra-office switchboard. Reference numeral 1-33 represents subscribers' telephones stored in the extra-office and reference numeral 1-5 represents a maintenance terminal for the test (maintenance console). Incidentally, reference numerals inside the parentheses represent signal passages associated with the execution of the processing procedures having the same reference numeral, or execution equipment.

The translation module 1-11 and the call control module 1-12 inside the call processing block 1-10 of the switchboard execute ordinary call connection control for the calls from the subscribers' telephones 1-31, 1-32 and 1-33 of the originating station or the terminating station.

When the subscriber's telephone 1-31 is set off-hook, generates a call and sends the telephone number (1'), for example, the call control module 1-12 receives the telephone number sent from the originating subscriber, and sends the telephone number to the translation module 1-11 (2'). The translation module 1-11 translates and analyzes the telephone number and sends terminating (pass line) information corresponding to the telephone number to the call control module 1-12 (3').

The call control module 1-12 executes the call processing in accordance with the terminating (pass line) information (4'). It connects the line to the subscriber's telephone 1-32 if the terminating telephone is the intra-office subscriber's, and connects the line to the subscriber's telephone 1-32 (5'). If the terminating telephone is the subscriber's of other office, the call control module 1-12 decides the outgoing trunk line to the terminating switchboard 1-40, and executes the outgoing connection (6').

The call control module 1-12 detects the off-hook operation by the called subscriber in response to the ringing signal. Then, it executes the ordinary call connection control for setting the voice path between the calling subscriber's telephone 1-31 and the called subscriber's telephone 1-32 or 1-33.

By utilizing the call processing block 1-10 for executing the ordinary call connection control, the testing system of the present invention connects the ordinary general subscriber's telephones as a maintenance telephone to the voice path (with the proviso that the subscriber's attribute of this telephone is set as the testing terminal) so that a maintenance party can conduct various tests such as a subscriber's test by using the ordinary subscriber's telephone in accordance with the following procedures. The procedure for connecting the ordinary subscriber's telephone as the maintenance telephone will be explained below.

FIG. 1 shows the originating processing procedure for the maintenance party telephone, and FIG. 2 shows its connection and cutoff processing procedures. First, the originating processing for the maintenance party telephone will be explained with reference to FIG. 1. The maintenance party sets the telephone number of the subscriber's telephone to be used as the maintenance party telephone from the testing maintenance terminal (maintenance console) 1-5, and generates the connection request to this telephone (1). The telephone number and the connection request that are inputted by the maintenance party are accepted by the test control module 1-21 in the test block.

The test block reports the connection processing request of the maintenance party telephone to the call processing block 1-10 (2). Receiving the telephone number from the test control module 1-21, the test accepting module 1-13 inside the call processing block 1-10 simulates the originating subscriber, generates a subscriber line protocol (3), and transmits the call message to the call control module 1-12 (4).

Each module then executes emulation as if the originating subscriber were present, converts the telephone number to the standard message of the subscriber line protocol, and transmits the telephone number translation request to the translation module 1-11 (5).

The translation module 1-11 executes the translation analysis of the telephone number in the same way as in the ordinary call processing and sends the terminating (path line) information corresponding to the telephone number to the call control module 1-12 (6).

The call control module 1-12 executes the originating processing in accordance with the terminating (path line) information (7), and connects the line to the subscriber's telephone 1-32 stored in the intra-office switchboard in accordance with the terminating side (8), or decides the outgoing trunk to the extra-office switchboard 1-40 and executes outgoing connection (9) so as to connect the line to the subscriber's telephone 1-33 stored in the extra-office switchboard.

Next, the connection and disconnection processing of the maintenance party telephone will be explained with reference to FIG. 2. The maintenance party telephone designated by the testing maintenance terminal (maintenance console) 1-5, for example, the intra-office subscriber's telephone 1-32 or the extra-office subscriber's telephone 1-33, is originated and enters the ringing state in the same way as in the ordinary call processing, as described already.

The maintenance party sets off-hook the intra-office subscriber's telephone 1-32 in response to ringing (10) or sets off-hook the extra-office subscriber's telephone 1-33 (11). Then, these telephones are subjected to the connection processing as the maintenance party telephones, and the call control modules 1-12 connect forward and backward paths (12) in accordance with the ordinary processing procedure, and report the event to the test accepting module 1-13 simulating the originating subscriber (13). In order to report the normal connection of the subscriber's telephone to the maintenance party, however, the call control module 1-12 executes the connection for sending a dial tone (DT) to the backward path.

The test accepting module 1-13 reports an off-hook of the maintenance party telephone to the test control module 1-21 (14). The test control module 1-21 causes the testing maintenance terminal (maintenance party console) 1-5 to display completion of connection of the maintenance party telephone (15).

Thereafter, the maintenance party conducts various tests by using the maintenance party telephone, and sets on-hook the maintenance party telephone when the test is completed (10, 11). Then, the call control module 1-12 reports the event of disconnection to the test accepting module 1-13 simulating the originating subscriber (13), and executes the path disconnect processing in accordance with the ordinary terminating disconnect procedure (12). In consequence, the maintenance party telephone is disconnected.

The test accepting module 1-13 reports an on-hook of the maintenance party telephone to the test block 1-10 (14), and the test control module 1-21 causes the test maintenance terminal (maintenance party console) 1-5 to display disconnection of the maintenance party telephone (15).

Next, an explanation will be given on the case where the disconnect request is generated from the test maintenance terminal (maintenance party console) 1-5. The disconnect request from the test maintenance terminal (maintenance party console) 1-5 is analogous to the disconnection procedure from the originating subscriber when it is viewed from the aspect of call processing.

The maintenance party telephone under connection is designated from the test maintenance terminal (maintenance party console) 1-5 to the test control module 1-2 (6). The test control module 1-21 designates the identification data of the call connected to the test accepting module 1-13 and requests disconnection of the maintenance party telephone (17).

The test accepting module 1-13 simulates the originating subscriber, generates the subscriber line protocol message (18), and sends the disconnect message to the call control module 1-12 (19). The call control module 1-12 executes the originating side disconnect processing (20), and executes disconnection (21) for the intra-office maintenance party telephone 1-32 or disconnection for the extra-office maintenance party telephone 1-33 (22).

The disconnect request from the test maintenance terminal (maintenance party console) 1-5 is the event that is analogous to an on-hook of the originating subscriber for the call processing, and is controlled in the same way as the ordinary call processing. Therefore, when the maintenance party telephone is in the off-hook condition at the time of the disconnect request, busy tone (BT) connection is executed for the backward path of that telephone terminal.

Next, an explanation will be given of the control function of the test block 1-20 for the maintenance party telephone. The test block 1-20 accepts, from the maintenance party, the maintenance party telephone connection request inclusive of the telephone number designating the subscriber's telephone that is used as the maintenance party telephone, and requests the call processing block 1-10 to execute the control.

The test block 1-20 also receives the off-hook or on-hook report of the maintenance party telephone from the call processing block 1-10, and executes the control so that the test maintenance terminal (maintenance party console) 1-5 displays completion of the connection of the maintenance party telephone of the disconnection. Furthermore, the test block 1-20 accepts the maintenance party telephone disconnect request designating the call under connection from the test maintenance terminal (maintenance party console), and requests the call processing block 1-10 to execute the disconnect control.

Next, an explanation will be given of the control function of the test accepting module 1-13 inside the call processing block. The test accepting module 1-13 simulates an originating subscriber, that does not physically exist, in software processing, converts the terminating telephone number information inputted by the maintenance party to the subscriber line protocol message, and transmits it to the call control module 1-12. The test accepting module 1-13 has also the function of inversely converting the standard message of the subscriber line protocol to the test control module 1-21 and transmitting the message so converted.

The above explains the procedures for designating the ordinary subscriber's telephone from the test maintenance terminal (maintenance party console) of the general-purpose information processing unit, connecting it as the maintenance party telephone to the voice path, and disconnecting the maintenance party telephone after the test is completed.

The test maintenance party (maintenance party console) 1-5 can be connected directly by cables to the control unit of the switchboard equipped with the test block 1-20, or can be installed at a remote place through a network such as a local area network (LAN) or a wide area network (WAN).

Figure 3:
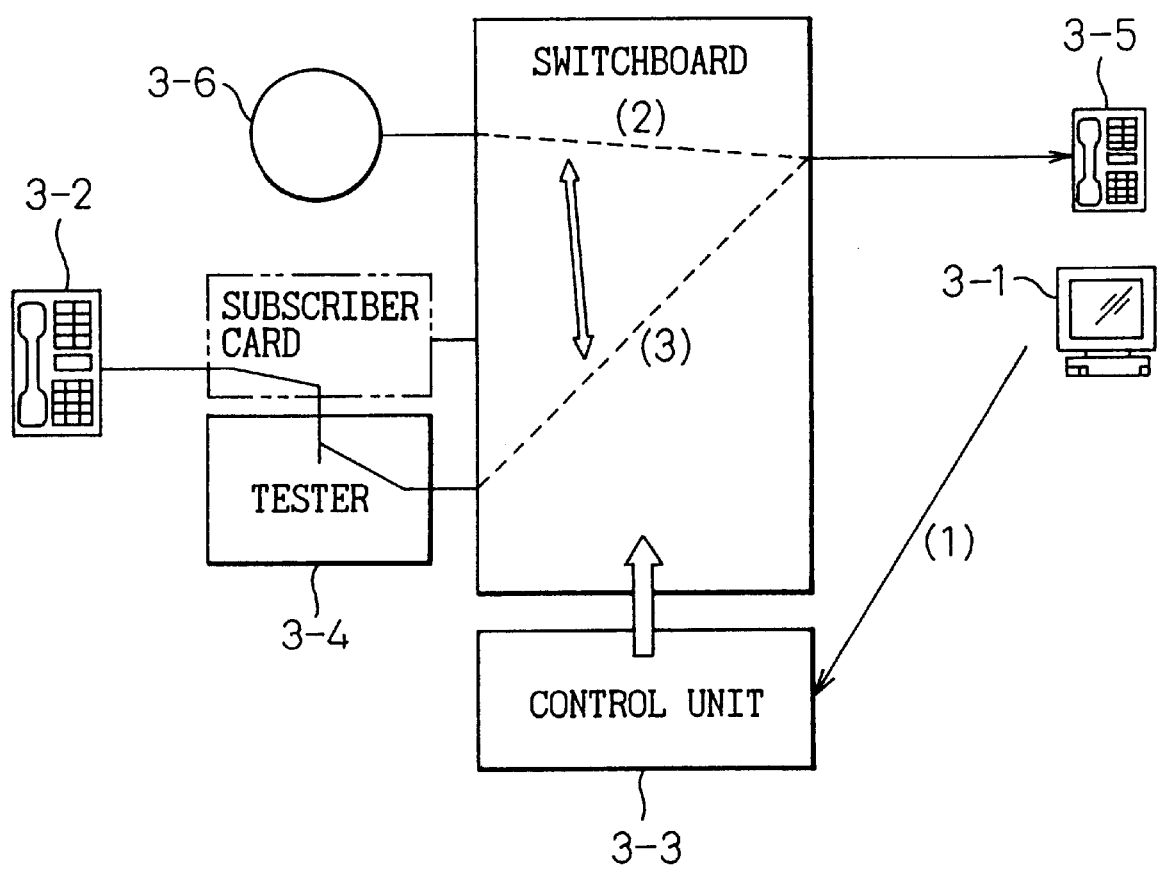
FIG. 3 is a block diagram useful for explaining the construction of the system and the basic procedure of the test according to one embodiment of the present invention.

FIG. 3 is an explanatory view of a basic procedure of the test using the maintenance party telephone and the maintenance party console according to this embodiment of the present invention. In the drawing, the maintenance party inputs the telephone number of the tested subscriber's telephone 3-2 from the test maintenance terminal (maintenance party console) 3-1 of the general-purpose information processing unit.

The control unit 3-3 of the switchboard (1) receives this telephone number, and hunts for the test device 3-4 corresponding to the subscriber's telephone 3-2 having this telephone number.

The telephone number of the subscriber's telephone 3-5 used as the maintenance party telephone is inputted through the test maintenance terminal (maintenance party console) 3-1. The control unit 3-3 of the switchboard also receives this telephone number. The terminating processing for the subscriber's telephone 3-5 used as the maintenance party telephone is executed by the procedure described above, and the bell of the telephone 3-5 rings. In the following procedures, this telephone is used as the maintenance party telephone.

When the maintenance party sets off-hooks this maintenance party telephone 3-5, the voice path is set between the maintenance party telephone 3-5 and the sound source device 3-6 of the dial tone (DT) (2), and the dial tone (DT) is sent to the maintenance party telephone 3-5.

The processing steps described so far are sequentially displayed on the test maintenance terminal (maintenance party console) 3-1. If the test content of the test command inputted to the test maintenance terminal (maintenance party console) involves the voice confirmation as in the case of the manual subscriber test, the voice path between the maintenance party telephone 3-5 and the testing device 3-4 is set under control of the control unit 3-3 (3).

The maintenance party conducts tests such as the message confirmation with the tested subscriber's telephone 3-2 and the pseudo-call through the maintenance party telephone 3-5. After the tests are completed, the end command is inputted through the testing maintenance terminal (maintenance party console) 3-1 so as to disconnect the path or to set on-hook the maintenance party telephone 3-5. In this way, the tests are completed.

The present invention makes it possible to conduct the tests for voice system equipment in the switchboard by using the ordinary subscribers' telephones without installing in advance any specific equipment as the testing maintenance terminal. The maintenance party needs only to designate the telephone number of the telephone used as the maintenance party telephone from the testing maintenance terminal (maintenance console) of the general-purpose information processing unit that is connected either directly by cables, or through the network such as the LAN, to the control unit of the switchboard.

The testing system side executes the terminating call devoid of the originating subscriber for the telephone having the telephone number so designated, and the maintenance party responds to this call and conducts various tests of voice system equipment by using this telephone. In this instance, it is possible to designate not only the intra-office subscribers' telephones but also the extra-office subscribers' telephones as the maintenance party telephone.

Various testing methods using the maintenance party telephone according to the present invention will be explained exemplarily with reference to FIGS. 4 to 12. In the drawings, symbol SLC#0·100' represents a subscriber interface card of the maintenance party telephone 100 connected by the procedure described above; symbol SLC#1·104' represents a subscriber interface card of the subscriber's telephone 104 as the test object; and symbol SLC#2·102' represents a subscriber interface card corresponding to an ordinary subscribers' telephone.

The testing maintenance terminal 106 is connected to the central control unit (CC) 108 of the switchboard. When the test command is transmitted to the central control unit 108, the control unit 108 sends the control signal corresponding the test command to an LRPC (Line/Register & Signal/Path Controller) control unit 114 of the switching (SW) unit through a processor access controller (PAC) 110. The LRPC control unit 114 sends the signals that control the subscriber interface card and the selector 116.

The test information is exchanged between the testing maintenance terminal 106 and the tester 118 through the central control unit 108, the processor access controller 110 and the signal controller (SGC) 120. Incidentally, reference numeral 119 denotes the measuring instrument that is connected to the tester 118.

Figure 4:
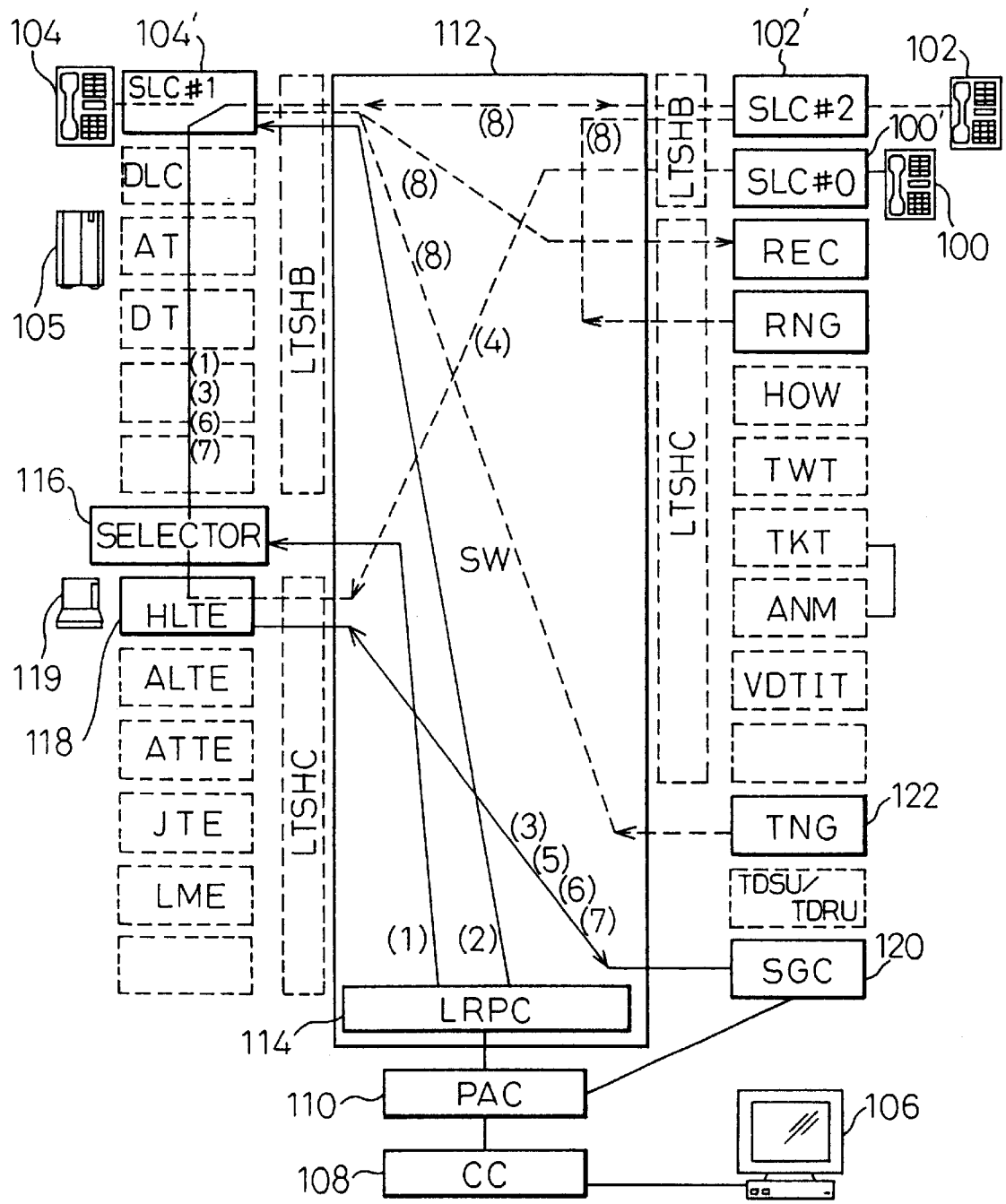
FIG. 4 is an explanatory view useful for explaining a bridge cut-off originating test of a manual analog subscriber's circuit according to the present invention.

FIG. 4 is an explanatory view useful for explaining a bridge cut-off transmission test of the annual analog subscriber circuit according to the present invention. Hereinafter, the testing procedures of the bridge cut-off transmission test will be itemized.

(1) Initially, the subscriber interface card SLC#1·104' as the test object is closed for the test, and the tester 118 and the subscriber interface card SLC#1·104' are connected by controlling the selector 116.

(2) A UAR (Universal Access Relay) of the subscriber interface card SLC#1·104' is activated, and the subscriber line side is cut off (bridge cut-off) as shown in the drawing. The signal line on the side of the switching unit 112 is connected to the tester 118.

(3) The start request for the measurement of an abnormal voltage and the manual test are executed by the signal controller 120.

(4) The path between the tester 118 and the subscriber interface card SLC#0·100' of the maintenance party telephone 100 is connected. The process steps described above are in common with each of the following tests.

(5) The off-hook request for the subscriber interface card SLC#1·104' is generated to the tester 118.

(6) The subscriber interface card SLC#1·104' detects off-hook.

(7) The call to the subscriber interface card SLC#2·102' (sending of the dial signal) is requested from the subscriber interface card SLC#1·104' to the tester 118.

(8) The path between the subscriber interface card SLC#1·104' and the subscriber interface card SLC#2·102' is connected. In this state, message confirmation is conducted between the maintenance party telephone 100 connected to the subscriber interface card SLC#0·100' and the telephone of the subscriber interface card SLC#2·102' connected through the tester 118 and the subscriber interface card SLC#1·104'.

(9) The on-hook request of the subscriber interface card SLC#1·104' is passed to the tester 118.

(10) The path between the subscriber interface card SLC#1·104' and the subscriber interface card SLC#2·102' is released.

(11) The path between the tester 118 and the subscriber interface card SLC#0·100' is released.

(12) The UAR operation of the subscriber interface card SLC#1·104' is stopped.

(13) The connection between the tester 118 and the subscriber interface card SLC#1·104' is released by controlling the selector 116.

(14) Test closure of the subscriber interface card SLC#1·104' is released.

In FIGS. 4 to 12, LTSHB means Line Trunk Shelf: Type B and LTSHC means Line Trunk Shelf: Type C.

Figure 5:
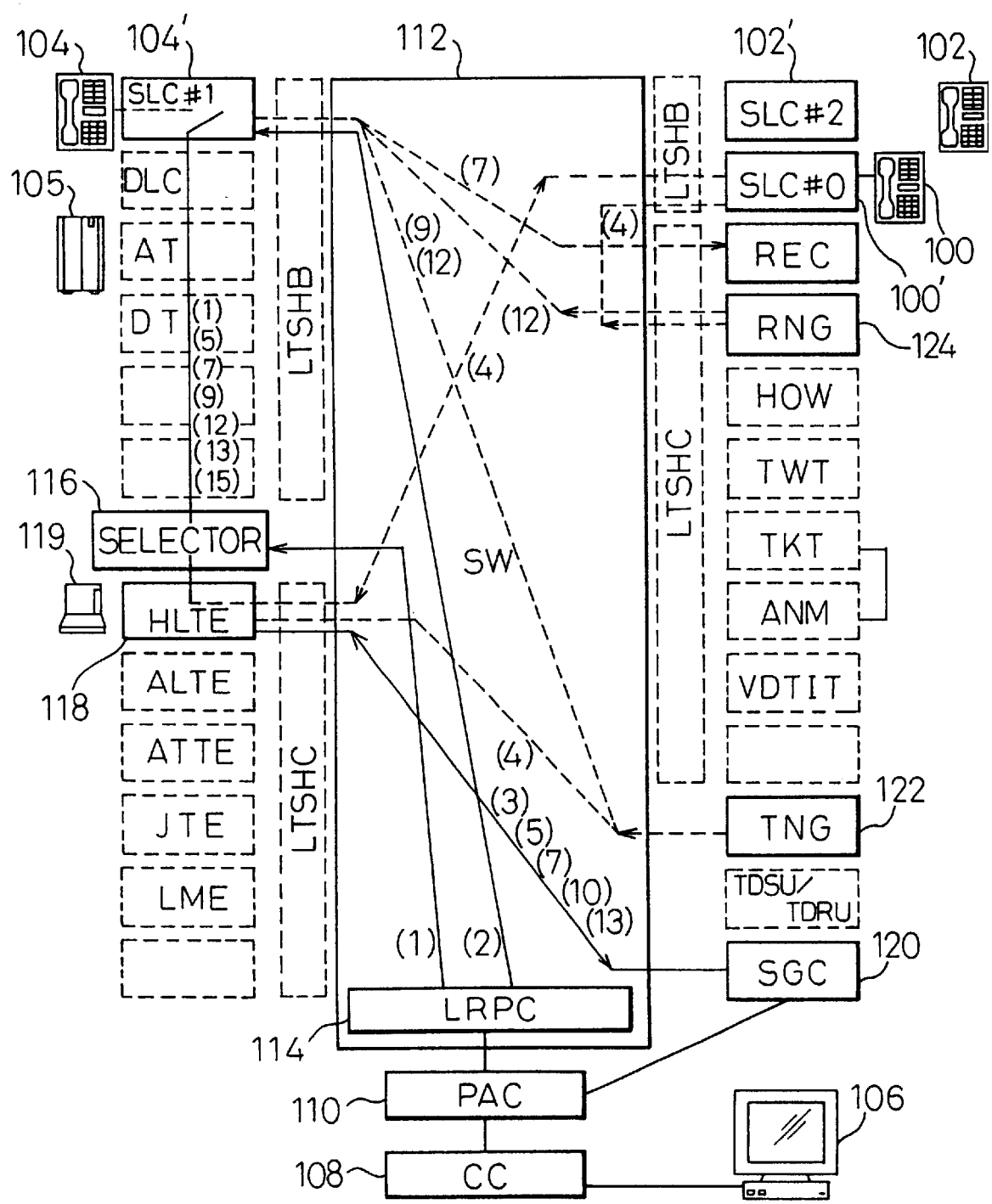
FIG. 5 is an explanatory view useful for explaining a bridge cut-off terminating test of the manual subscriber's circuit according to the present invention.

FIG. 5 is an explanatory view of the bridge cut-off terminating test of the manual analog subscriber circuit according to the present invention. This test performs an FMRB (Faults Man Ring Back) test. When on-hook is executed by transmitting the special service code for the FMRB test, ringing occurs in the telephone number that generates this special service code, and the terminating test can be carried out. The testing procedures will be listed below.

(1) The subscriber interface card SLC#1·104' of the test object is closed for the test, and the tester 118 and the subscriber interface card SLC#1·104' are connected by controlling the selector 116.

(2) The UAR (Universal Access Relay) of the subscriber interface card SLC#1·104' is activated. As shown in the drawing, the subscriber line side is cut off (bridge cut-off) and the signal line of the switching unit 112 is connected to the tester 118.

(3) The signal controller 120 executes the measurement of the abnormal voltage and the manual test start request.

(4) The path between the tester 118 and the subscriber interface card SLC#0·100' of the maintenance party telephone 100 is connected.

(5) The off-hook request for the subscriber interface card LC#1·104' is generated to the testing equipment 118.

(6) The subscriber interface card SLC#1·104' detects off-hook.

(7) The transmission of the FMRB special service code is requested to the testing equipment 118 through the subscriber interface card SLC#1·104'.

(8) The path is connected by the FMRB procedure.

(9) The dial tone DT from the tone generator TNG122 is sent to the maintenance party telephone 100 through the subscriber interface card SLC#1·104'→tester HLTE subscriber interface card SLC#0·100'.

(10) The on-hook request for the subscriber interface card SLC#1·104' is generated to the testing equipment 118.

(11) After the subscriber interface card SLC#1·104' detects an on-hook, the subscriber interface card SLC#1·104' is connected to the call signal source RNG 124.

(12) The ringing signal is sent to the tester 118 through the subscriber interface card SLC#1.

(13) The off-hook request for the subscriber interface card SLC#1·104' is made to the testing equipment 118.

(14) The subscriber interface card SLC#1·104' executes the off-hook detection.

(15) The dial tone DT is sent to the maintenance party telephone 100 through the tone generator 122→tester 118→subscriber interface card SLC#0·100'.

(16) The on-hook request for the subscriber interface card SLC#1·104' is generated by the testing equipment 118.

(17) The path between the subscriber interface card SLC#1·104' and the tone generator 122 is released.

(18) The path between the testing equipment 118 and the subscriber interface card SLC#0·100' is released.

(19) The UAR operation of the subscriber interface card SLC#1·104' is stopped.

(20) The connection between the tester 118 and the subscriber interface card SLC#1·104' is released by controlling the selector 116, and the test closing of the subscriber interface card SLC#1 is released.

Figure 6:
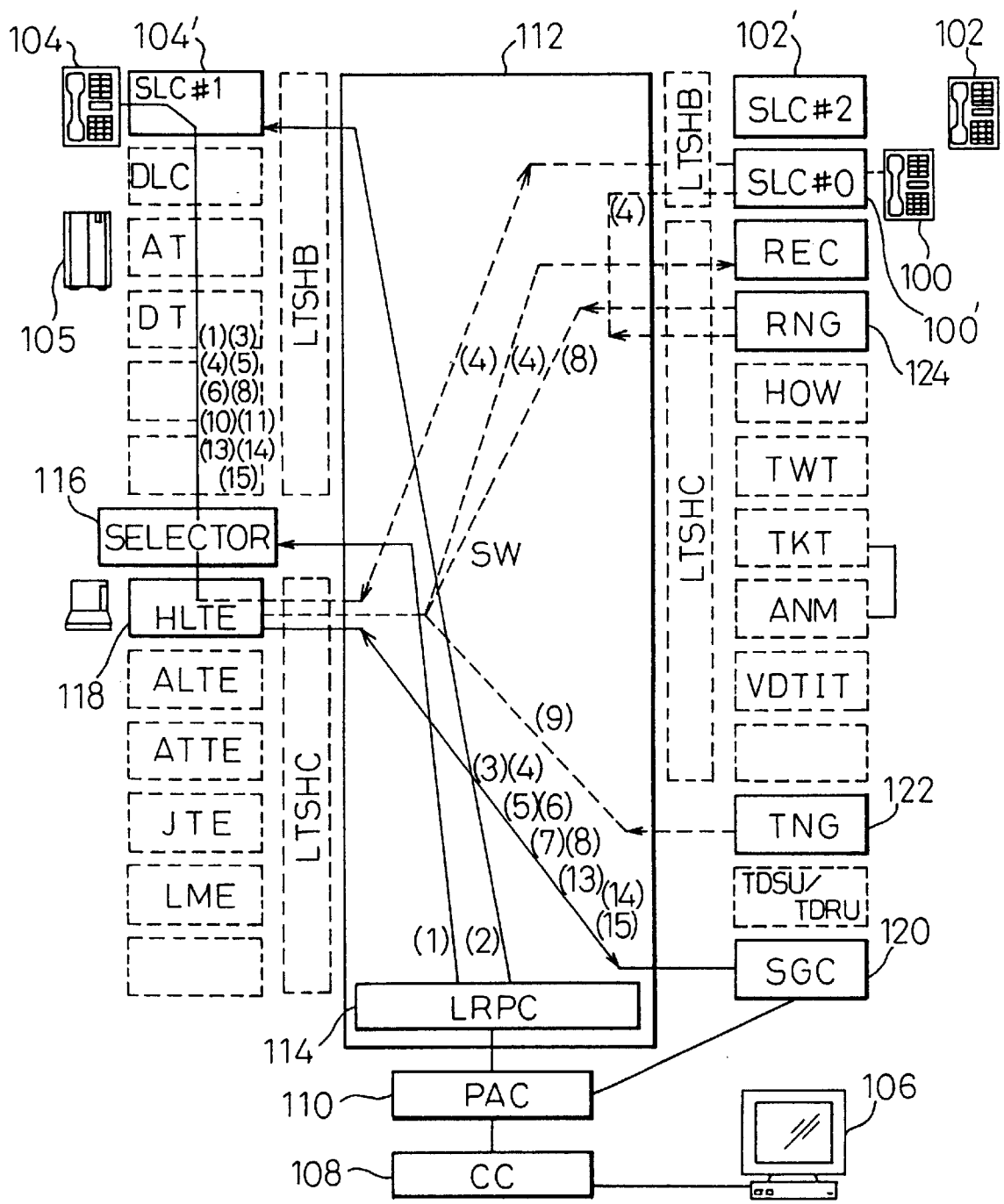
FIG. 6 is an explanatory view useful for explaining a manual analog subscriber's line test according to the present invention.

FIG. 6 is an explanatory view of the manual analog subscriber line test according to the present invention. This test conducts the measurement of the voltage, resistance and capacitance on the subscriber side, the message test, the message current test, the DP (dial pulse) test, the PB (push button) test, and the line polarity inverting test. Hereinafter, the test procedures will be itemized.

(1) The subscriber interface card SLC#1·104' of the test object is closed for the test, and the tester 118 and the subscriber interface card SLC#1·104' are connected by controlling the selector 116.

(2) The UAR (universal Access Relay) of the subscriber interface card SLC#1·104' is operated. The subscriber side is cut off (bridge cut-off) as shown in FIG. 6, and the signal line on the side of the switching unit 112 is connected to the tester 118.

(3) The signal controller 120 executes the measurement of the abnormal voltage and the manual test start request.

(4) The path between the tester 118 and the subscriber interface card SLC#0·100' of the maintenance party telephone 100 is connected.

(5) The measurement test is requested.

(6) Battery supply is requested.

(7) Polarity inversion is requested.

(8) Tester 118→subscriber interface card SLC#1·104'→transmission of ringing through the route of the subscriber's telephone is requested.

(9) Ring-back tone transmission from the tone generator 122 to the subscriber interface card SLC#0·100' through the testing equipment 118 is requested. The ringing transmission and ring-back tone transmission request is executed repeatedly until off-hook of the subscriber's telephone 104 of the subscriber interface card SLC#1·104' is detected.

(10) An off-hook of the subscriber's telephone 104 of the subscriber interface card SLC#1·104' is detected.

(11) The ringing stop is requested.

(12) Message confirmation is made.

(13) The message current measurement test is requested.

(14) The DP test is requested.

(15) The BP test is requested.

(16) After various tests are completed, the maintenance party telephone or the tested telephone is hooked on.

(17) The path between the tester 118 and the subscriber interface card SLC#0·100' is released.

(18) The UAR operation of the subscriber interface card SLC#1·104' is stopped.

(19) The connection between the tester 118 and the subscriber interface card SLC#1·104' is released by controlling the selector 116, and the test closing of the subscriber interface card SLC#1·104' is released.

Figure 7:
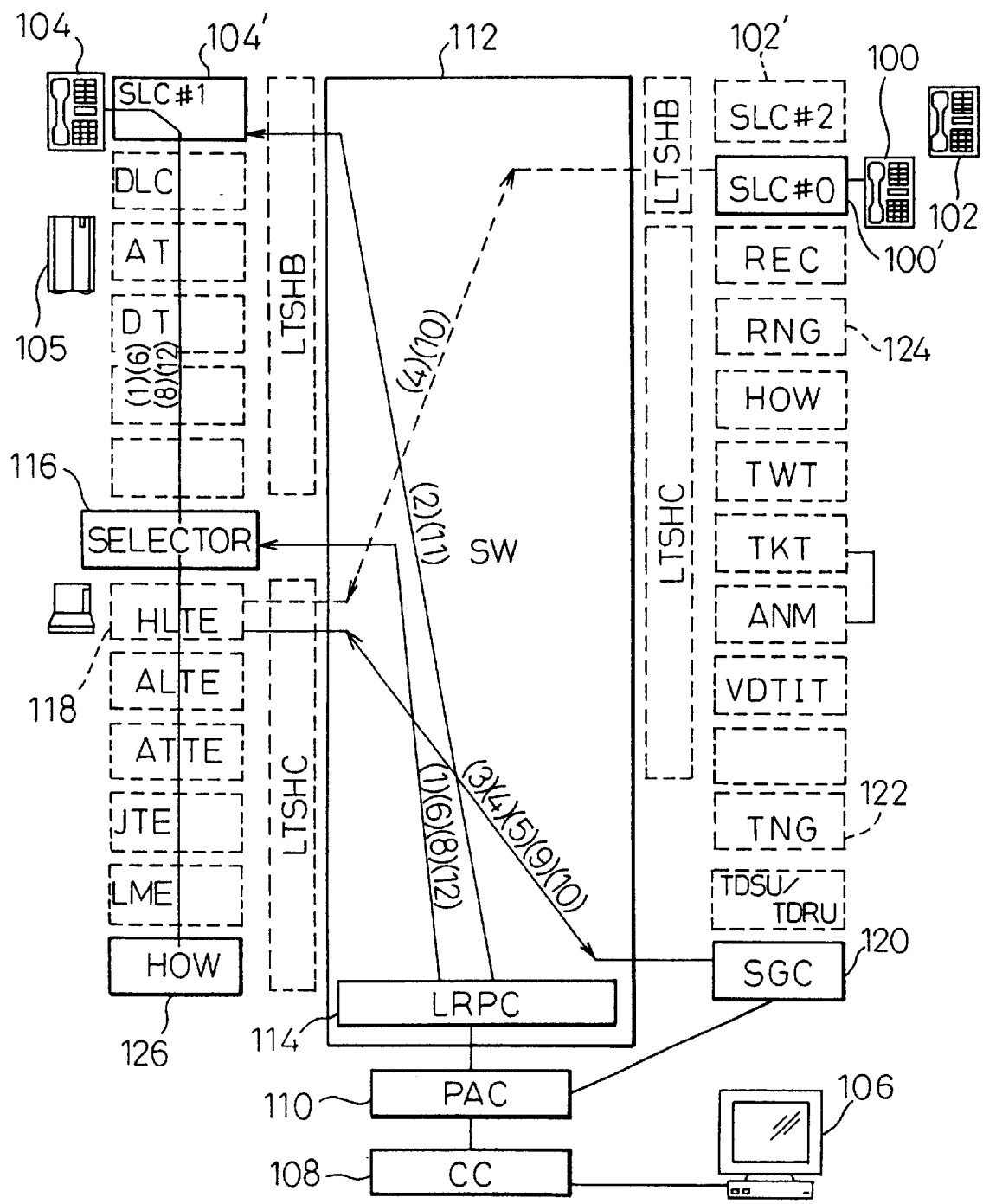
FIG. 7 is an explanatory view useful for explaining a howler sending test according to the present invention.

FIG. 7 is an explanatory view of the howler sending test according to the present invention. This test is directed to confirm howler sending and to confirm the stop of howler sending upon on-hook of the subscriber's telephone. Hereinafter, the test procedures will be itemized.

(1) The subscriber interface card SLC#1·104' as the test object is closed for the test, and the tester 118 and the subscriber interface card SLC#1·104' are connected by controlling the selector 116.

(2) The UAR (Universal Access Relay) of the subscriber interface card SLC190 1·104' is operated. As shown in FIG. 7, the subscriber side is cut off (bridge cut-off) and the signal line on the side of the switching unit 112 is connected to the tester 118.

(3) The signal controller 120 executes the measurement of the abnormal voltage and the manual test start request.

(4) The path between the testing equipment 118 and the subscriber interface card SLC#0·100' of the maintenance party telephone 100 is connected.

(5) The temporarily stop of the subscriber monitor is requested by the tester 118.

(6) The connection between the subscriber interface card SLC#1·104' and the tester 118 is switched to the connection between the subscriber interface card SLC#1·104' and the howler sound source (HOW) 126 by controlling the selector 116.

(7) The howler sending condition is sent from the howler sound source 126 to the test maintenance terminal 106 through the signal controller 120. Then, howler sending is confirmed and at the same time, the stop of howler sending by subscriber's on-hook is confirmed.

(8) The connection between the subscriber interface card SLC#1.104' and the howler sound source 126 is switched to the connection between the subscriber interface card SLC#1·104 and the tester by controlling the selector 116.

(9) Re-start of the subscriber monitor is requested to the tester 118.

(10) The path between the tester 118 and the subscriber interface card SLC#0·100' is released.

(11) The UAR operation of the subscriber interface card SLC#1·104' is stopped.

(12) The connection between the tester 118 and the subscriber interface card SLC#1·104' is released by controlling the selector 116, and the test closing of the subscriber interface card SLC#1·104' is released.

Figure 8:
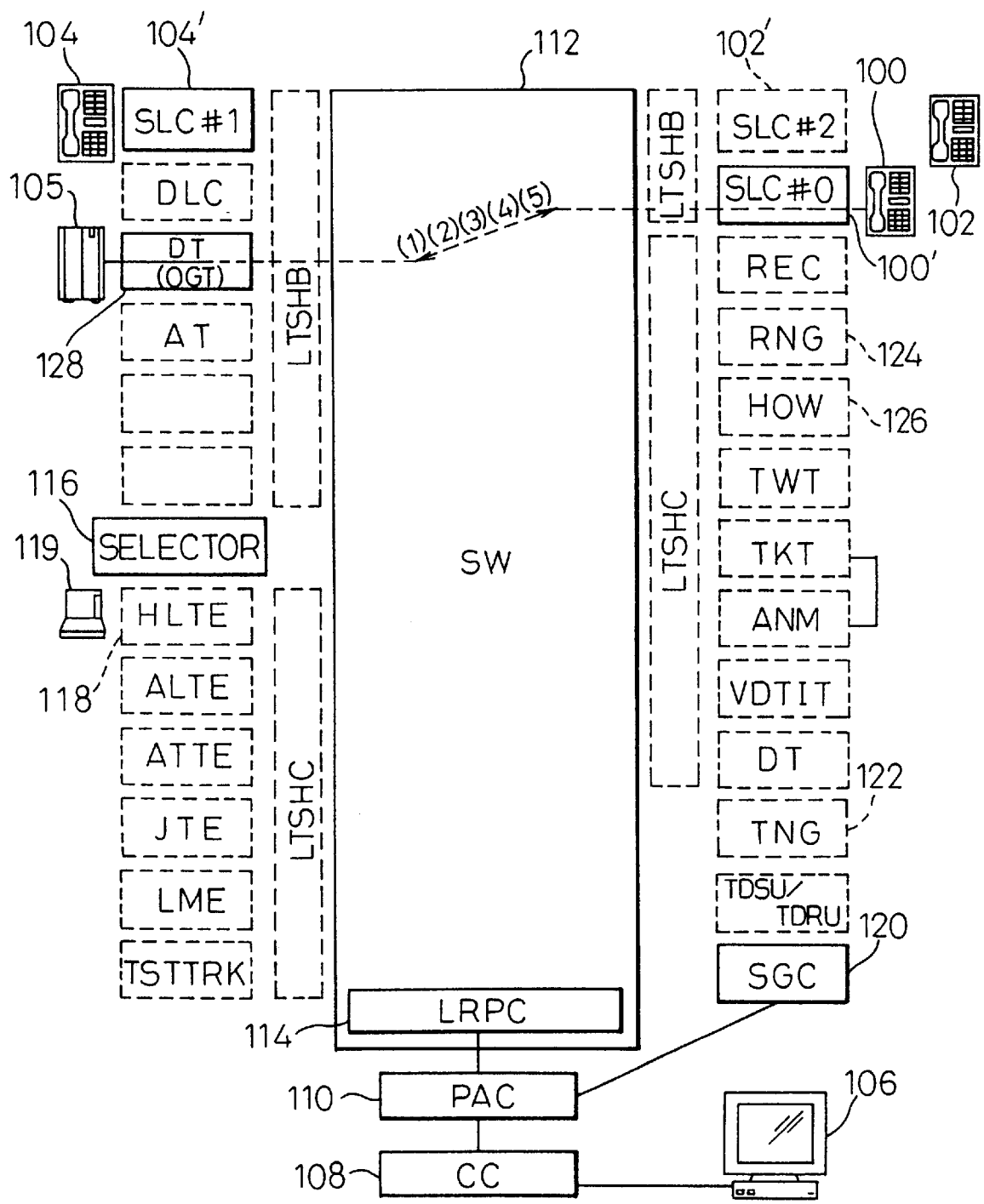
FIG. 8 is an explanatory view useful for explaining a manual trunk test (trunk junction test) according to the present invention.

FIG. 8 is an explanatory view of a manual trunk test (trunk junction test) according to the present invention. Hereinafter, the test procedures will be itemized.

(1) The path between a digital outgoing trunk DT (OGT) and the subscriber interface card SLC#0·100' is connected.

(2) A call is generated from the intra-office maintenance party telephone 100 to the telephone number of the extra-office automatic response trunk ACC, and the test is started.

(3) The test tone sent from the extra-office automatic response trunk ACC is listened by the intra-office maintenance telephone 100 in order to confirm that the test tone is terminated to the extra-office (terminating office) automatic response trunk AAC.

(4) The call is disconnected by an on-hook of the intra-office maintenance party telephone 100, and the test is completed.

(5) The path between the digital outgoing trunk DT (OGT) 128 and the subscriber interface card SLC#0·100' is released.

Figure 9:
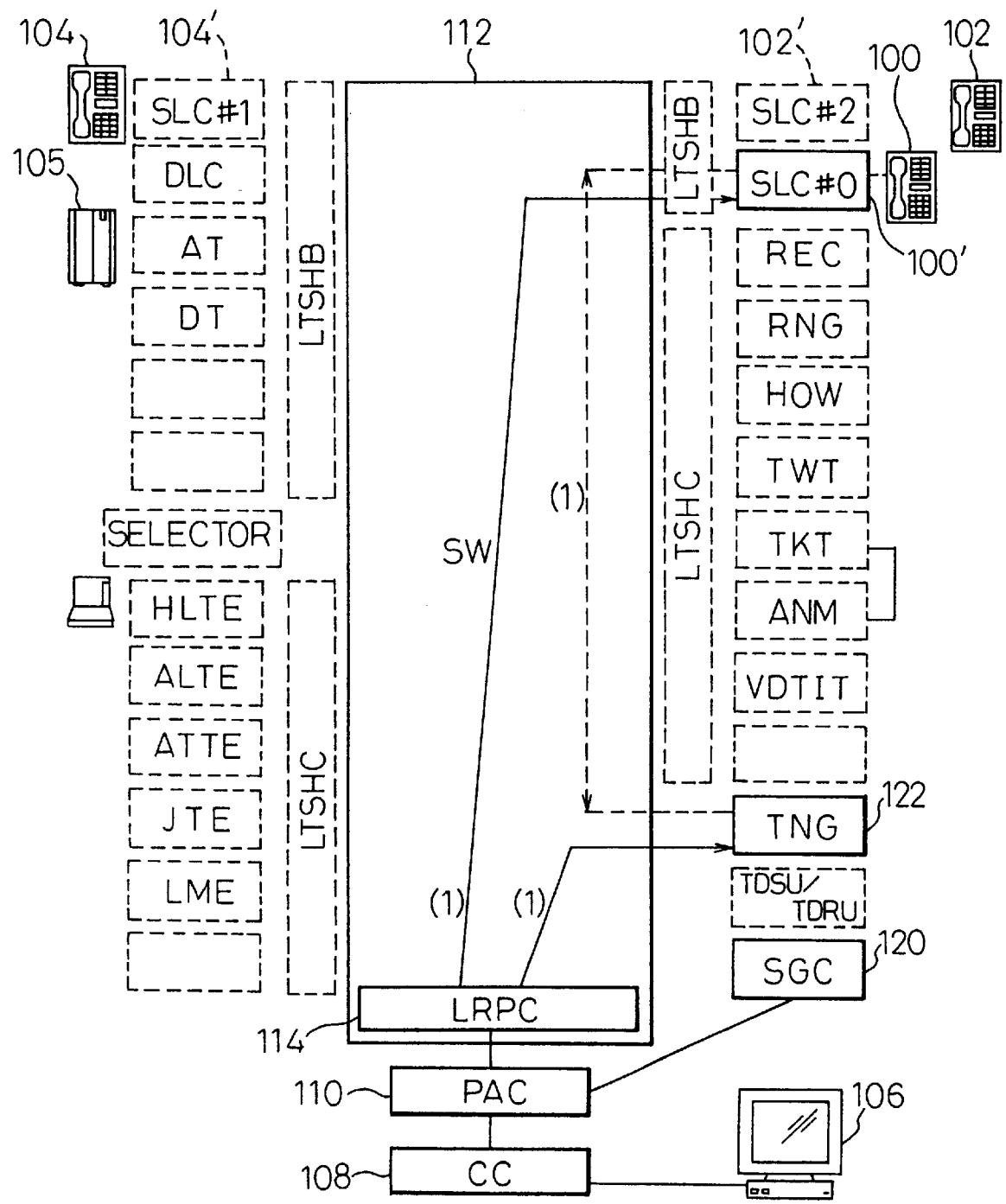
FIG. 9 is an explanatory view useful for explaining an audibility test (tone test) according to the present invention.

FIG. 9 is an explanatory view of the audibility test (tone test) according to the present invention. Hereinafter, the test procedures will be itemized.

(1) The path between the tone generator 122 and the subscriber interface card SLC#0·100' is connected.

(2) The tested tone is confirmed by the headset of the maintenance party telephone 100.

(3) The path between the tone generator 122 and the subscriber interface card SLC#0·100' is released.

Figure 10:
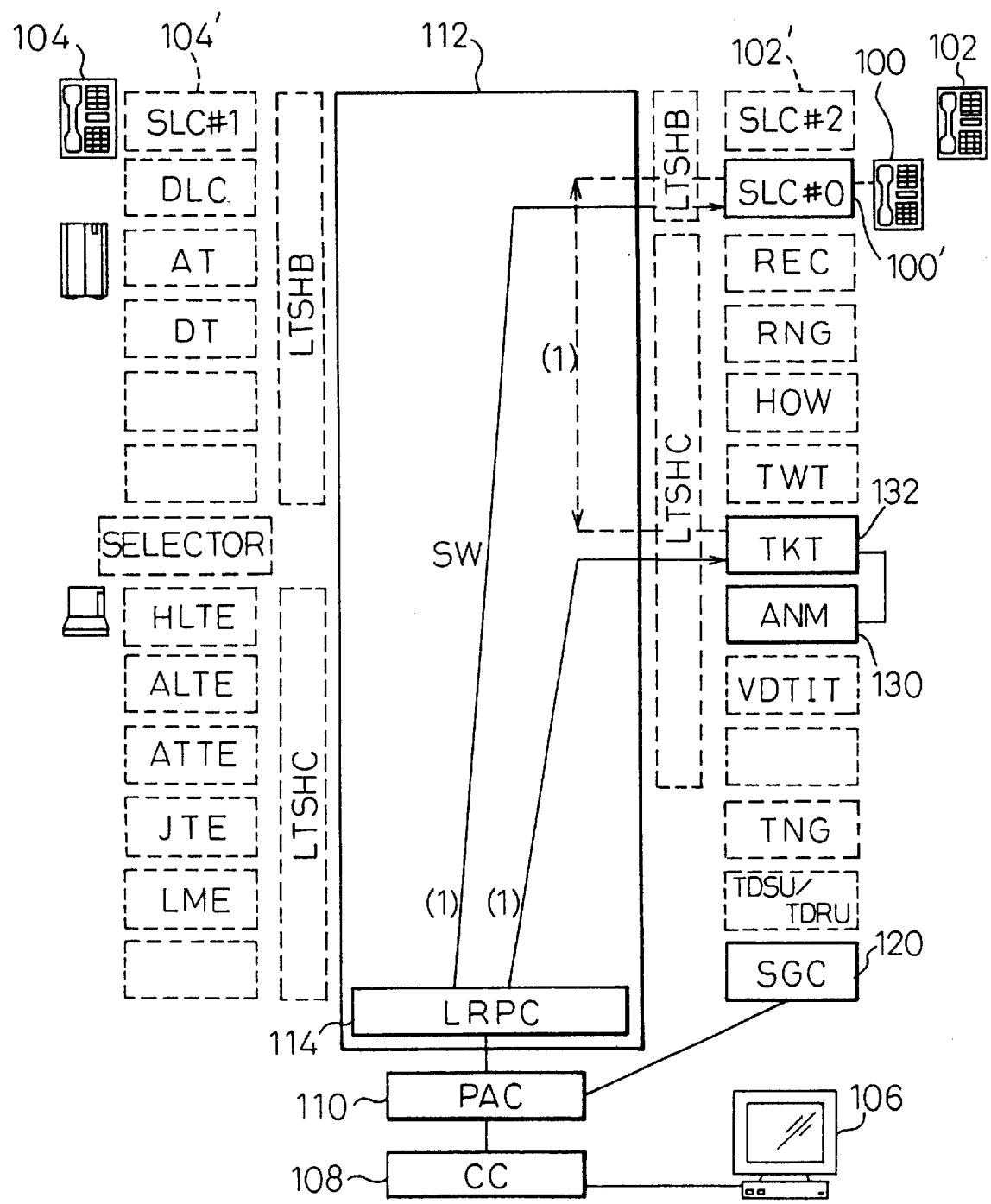
FIG. 10 is an explanatory view useful for explaining an audibility test (announcement test) according to the present invention.

FIG. 10 is an explanatory view of the audibility test (announcement test) according to the present invention. Hereinafter, the test procedures will be itemized.

(1) The path between a talky trunk (TKT) 132 connected to an announcement machine (ANM) 130 and the subscriber interface card SLC#0·100' is connected.

(2) The tested announcement is confirmed at the headset of the maintenance party telephone 100.

(3) The path between the talky trunk 132 and the subscriber interface card SLC#0·100' is released.

Figure 11:
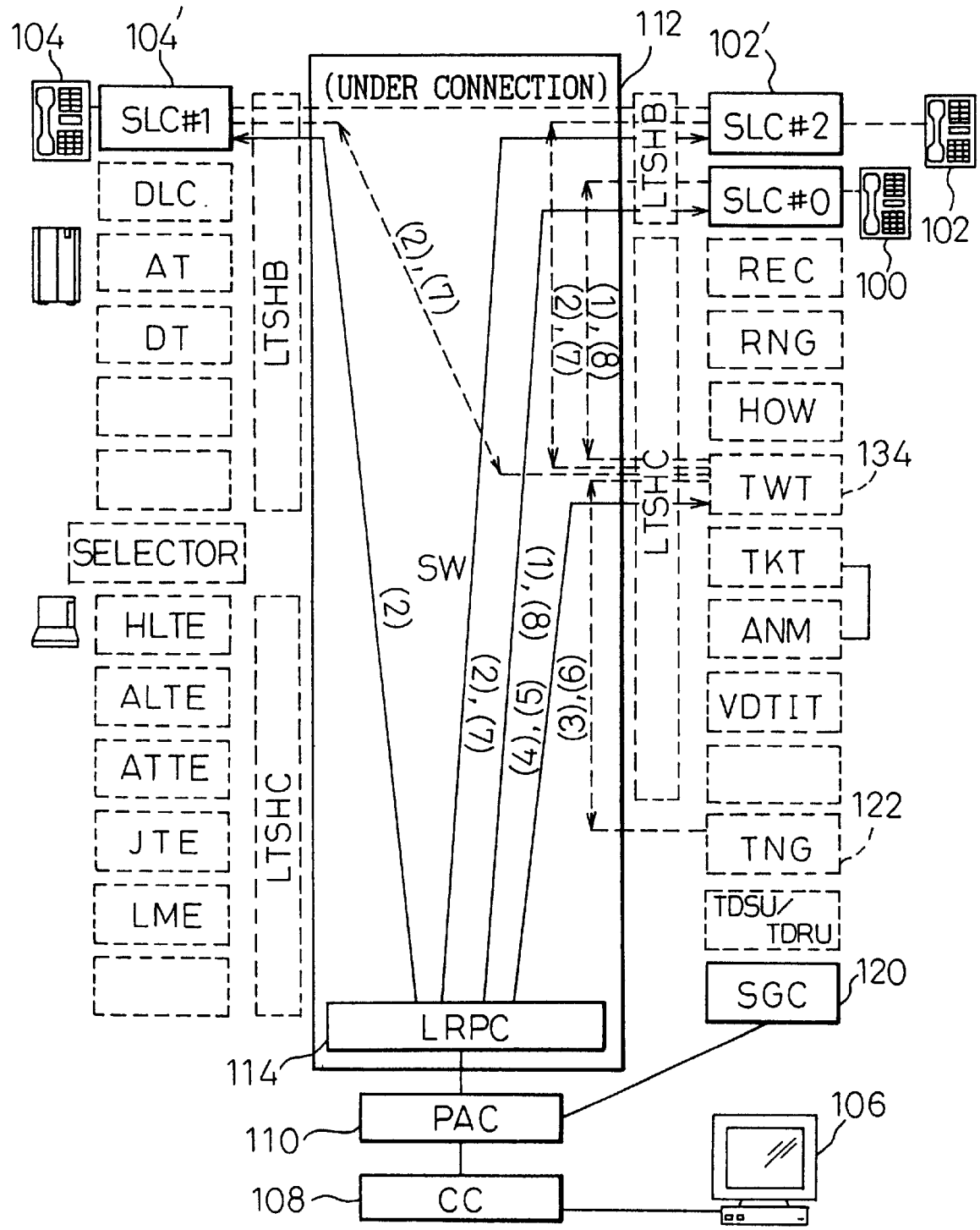
FIG. 11 is an explanatory view useful for explaining a line monitor according to the present invention.

FIG. 11 is an explanatory view of the line monitor according to the present invention. Hereinafter, the test procedures will be itemized.

(1) The path between the subscriber interface card SLC#0·100' and the multiple party message trunk (TWT) 134 is connected.

(2) The path between the subscriber interface card SLC#1·104' during the call and the multiple party message trunk (TWT) 134 is connected.

(3) The path between the tone sound source device 122 under monitor and the multiple party trunk 134 is connected.

(4) The activation of multiple party connection is requested to the multiple party message trunk 134, and monitor is started.

(5) The stop of the multiple party message connection is requested to the multiple party message trunk 134.

(6) The path between the tone sound source device 122 under monitor and the multiple party message trunk 134 is released.

(7) The path between the subscriber interface card SLC#1·104' and the SLC#2·102' multiple party message trunk TWT134 is released.

(8) The path between the subscriber interface card SLC#0·100' of the maintenance party telephone 100 and the multiple party message trunk 134 is released.

Figure 12:
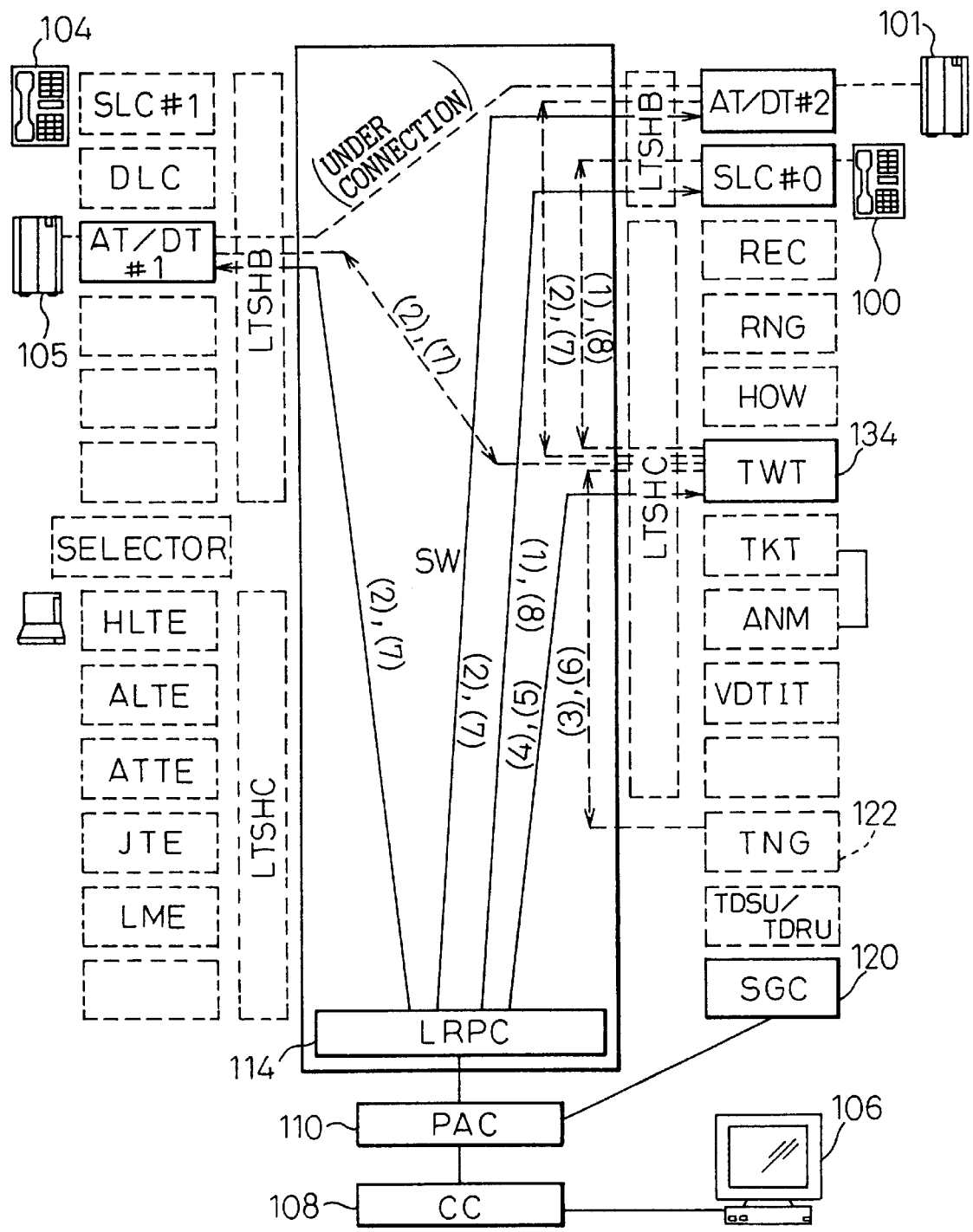
FIG. 12 is an explanatory view useful for explaining a trunk monitor according to the present invention.
Figure 13:
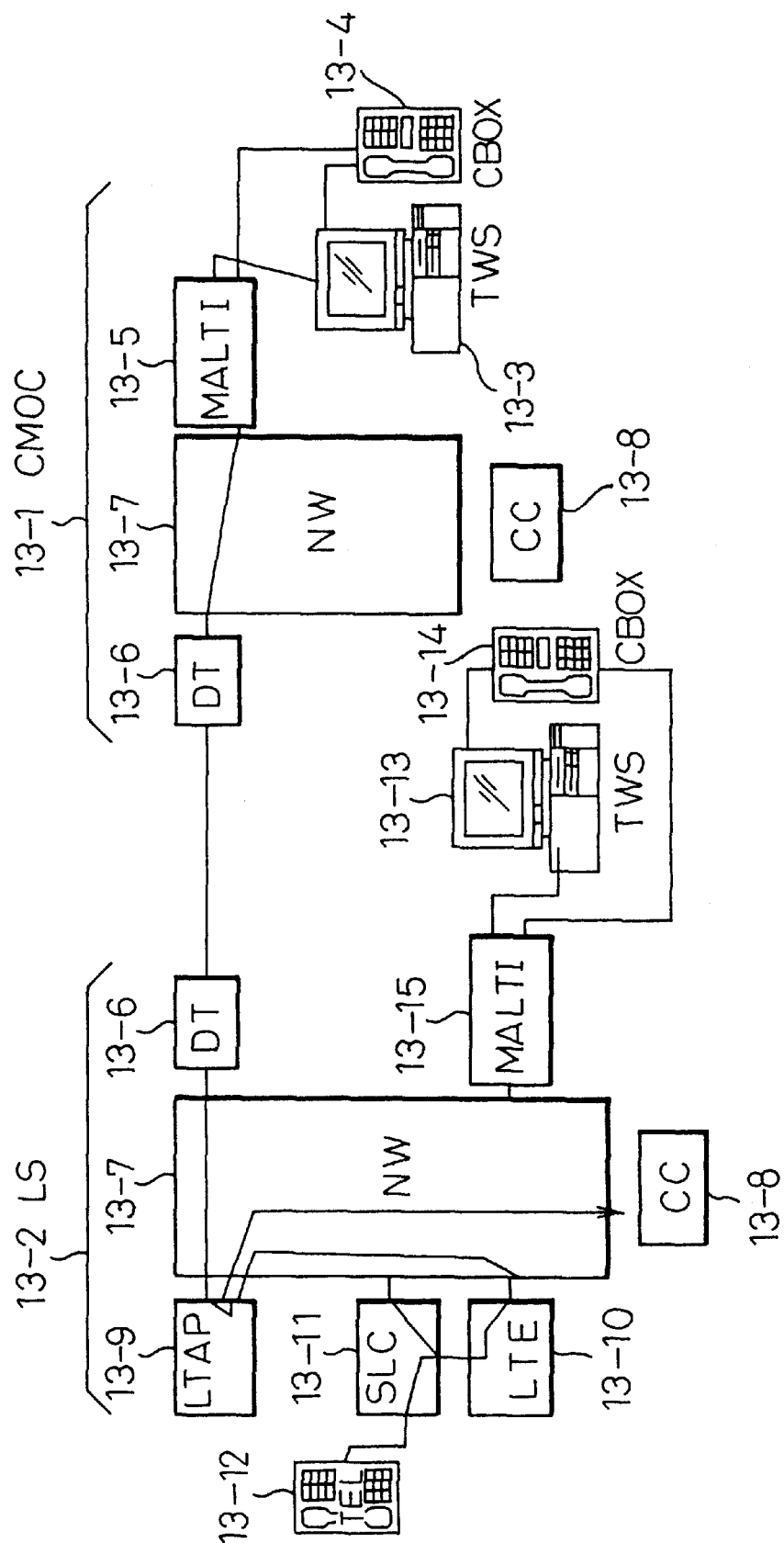
FIG. 13 is a schematic view showing the basic construction of a tester for voice system equipment in a switchboard according to the prior art.

FIG. 12 is an explanatory view of the of the trunk monitor according to the present invention. Hereinafter, the test procedures will be itemized.

(1) The path between the subscriber interface card SLC#0·100' and the multiple party message trunk 134 is connected.

(2) The path between the trunks AT/DT#1, AT/DT#2 and the multiple party trunk 134 is connected.

(3) The path between the tone sound source device 122 under monitor and the multiple party message trunk 134 is connected.

(4) The activation of the multiple party message connection is requested to the multiple party message trunk 134, and monitor is started.

(5) The stop of the multiple party message connection is requested to the multiple party message trunk 134.

(6) The path between the sound source device 122 of the tone under monitor and the multiple party message trunk 134 is released.

(7) The path between the trunks AT/DT#1, AT/DT#2 during the speech and the multiple party message trunk 134 is released.

(8) The path between the subscriber interface card SLC#0·100' of the maintenance party telephone 100 and the multiple party message trunk 134 is released.

As described above, the present invention can economically constitute a testing system by using the ordinary subscriber's telephone as the maintenance party telephone at the time of the test and by connecting it to the sound device of the test object or the test equipment by switching the speech path by software processing of the control unit of the switchboard, without calling for test-only auxiliary testing equipment for the speech system, adapters, and so forth.

The testing maintenance terminal and the maintenance party telephone according to the present invention have low dependence on the models of switchboards. Therefore, the maintenance specifications can be easily integrated. Furthermore, so long as the subscribers' line is available, the maintenance party can conduct the test of the speech system equipment by using the telephone connected to the subscribers' line as the maintenance party telephone. So long as the testing maintenance terminal is connected to the control unit of the tested switchboard through the LAN, or the like, the test can be activated even from a remote place away from the tested switchboard.

Because the present invention does not require equipment having the interface function with the centralized maintenance office, the present invention makes it possible to execute remote maintenance even from remote offices other than the centralized maintenance office. In this instance, various tests for voice system equipment of the tested subscribers can be made by simply designating the telephone numbers without taking the correspondence relation between the tested subscribers and the switchboard into specific consideration.

Incidentally, the subscriber's telephone designated as the maintenance party telephone according to the present invention can be used for accepting troubles.

What is claimed is:

1. A testing system for voice system equipment in a switchboard, comprising:

inside a call processing block of a control unit of said switchboard, a test accepting module, a call control module, and a translation module;

wherein said test accepting module has a function of transmitting a call message to said call control module on the basis of telephone number information of an ordinary subscriber's telephone designated as a maintenance party telephone from a testing maintenance terminal;

wherein said call control module and said translation module each have a function of executing an emulation processing of a call connection processing for said ordinary subscriber's telephone designated as said maintenance party telephone in accordance with said call message transmitted from said test accepting module, in the same way as an ordinary call connection processing; and wherein said testing system has a construction such that said ordinary subscriber's telephone designated as said maintenance party telephone is connected to voice system equipment or a tester in said switchboard through a voice path set by said switchboard so as to conduct a test including a voice confirmation.

2. A testing system for voice system equipment in a switchboard according to claim 1, which has a construction such that said ordinary subscriber's telephone designated as said maintenance party telephone is connected to a tester for a subscriber's circuit test and for a subscriber's line test through the voice path set by said switchboard.

3. A testing system for voice system equipment in a switchboard according to claim 1, which has a construction such that said ordinary subscriber's telephone designated as said maintenance party telephone is connected to a trunk for executing a trunk junction test through the voice path set by said switchboard.

4. A testing system for voice system equipment in a switchboard according to claim 1, which has a construction such that said ordinary subscriber's telephone designated as said maintenance party telephone is connected to a sound source for generating various tones or to a talky trunk for sending a voice announcement through the voice path set by said switchboard.

5. A testing system for voice system equipment in a switchboard according to claim 1, which has a construction such that said ordinary subscriber's telephone designated as said maintenance party telephone, and a subscriber's telephone during speech as the object of monitor, or an outgoing trunk, or an incoming trunk, are connected to a multiple party trunk through the voice path set by said switchboard.

6. A testing system for voice system equipment in a switchboard according to claim 1, wherein said testing maintenance terminal is connect to a control unit of a switchboard as a test object through a local area network or a wide area network.

7. A testing system for voice system equipment in a switchboard comprising:

a testing maintenance terminal for inputting telephone number information of an ordinary subscriber's telephone designated as a maintenance party telephone;

a call control module disposed inside a call processing block of a control unit of a switchboard, for executing an ordinary call connection processing in response to calls from intra-office and/or extra-office ordinary subscribers' telephones;

a translation module disposed likewise in said call processing block, for translating and analyzing the telephone number from said call control module, and sending terminating information corresponding to the telephone number to said call control module; and a test accepting module for transmitting a call message to said call control module on the basis of the telephone number information of said ordinary subscriber's telephone designated as said maintenance party telephone and inputted from said testing maintenance terminal;

wherein said call control module and said translation module each emulates the call connection processing for said ordinary subscriber's telephone designated as said maintenance party telephone in the same way as the ordinary call connection processing in accordance with the call message from said test accepting module, and wherein said ordinary subscriber's telephone designated as said maintenance party telephone is connected to voice system equipment or a tester in said switchboard through a voice path set by said switchboard so as to conduct a test including a voice confirmation.

8. A testing system for voice system equipment in a switchboard according to claim 7, wherein said control unit of said switchboard further includes a test control block for testing various voice system equipment of said switchboard.

9. A testing system for voice system equipment in a switchboard according to claim 7, wherein said testing maintenance terminal is a testing maintenance terminal of a general-purpose information processing unit.

10. A testing system for voice system equipment in a switchboard according to claim 7, wherein said testing maintenance terminal has a display, and said display displays completion of connection and/or disconnection of said maintenance party telephone designated by said maintenance terminal.

11. A testing system for voice system equipment in a switchboard according to claim 7, wherein said testing maintenance terminal is connected to said control unit of said switchboard through a local area network or a wide area network.

* * * * *